(12) United States Patent
Yuge et al.

(10) Patent No.: US 6,243,125 B1
(45) Date of Patent: Jun. 5, 2001

(54) OPTICAL PRINTER HEAD FOR AN OPTICAL PRINTER

(75) Inventors: Tomohiko Yuge; Toshiaki Nakahara; Hideo Kato; Yuuichi Kimura, all of Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/392,720

(22) Filed: Sep. 9, 1999

(30) Foreign Application Priority Data

Jul. 12, 1998 (JP) .................................... 10-347109

(51) Int. Cl.[7] .................................... B41J 15/14
(52) U.S. Cl. ............................. 347/241; 347/256
(58) Field of Search .................... 347/241, 242, 347/256, 257, 232, 244; 385/89; 250/226

(56) References Cited

U.S. PATENT DOCUMENTS 5,408,559 * 4/1995 Takahashi et al. ..................... 385/89
5,444,520 * 8/1995 Murano ................................. 347/244
5,870,131 * 2/1999 Yuge et al. ........................... 347/232

* cited by examiner

Primary Examiner—N. Le
Assistant Examiner—Hai C. Pham
(74) Attorney, Agent, or Firm—Oblon, Spivak, McClelland, Maier & Neustadt, P.C.

(57) ABSTRACT

An optical printer head capable of minimizing production of a ghost by incidence of light reflected on a filter holding hole. Light emitted from a light source is reflected out of a maximum allowable incident angle to minimize generation of a ghost due to incidence of reflected light on a selfoc lens array while reducing a size of a filter holding hole for holding each of filters therein. Also, a peripheral surface of the filter holding hole may be rendered rough, to thereby provide a scattering surface, resulting in preventing repeated reflection of light emitted from the light source on the peripheral surface of the filter holding hole.

6 Claims, 16 Drawing Sheets

OPTICAL PRINTER HEAD FOR AN OPTICAL PRINTER

BACKGROUND OF THE INVENTION

This invention relates to an optical printer head for an optical printer such as a color video printer or the like, and more particularly to an optical printer head adapted to substantially prevent generation of a ghost due to light reflected by a peripheral surface of a light passage hole formed through a filter holder for holding filters thereon so as to act as a light path.

An optical printer for forming a desired image on a record medium such as, for example, a color film or the like is known in the art. Typical one of such optical printers has a fluorescent luminous tube incorporated therein so as to act as a light source. The optical printer is so constructed that light emitted from the fluorescent luminous tube is guided through red, green and blue color filters selectively changed over, resulting in light of the three primary colors being obtained, which is then subject to writing on a record medium such as a color film or the like, leading to formation of a full-color image thereon.

Now, such an optical printer will be described with reference to FIG. 15. An optical printer generally designated at reference numeral 50 in FIG. 15 includes an optical printer head 100 which is reciprocated in a sub-scanning direction A with respect to a record medium W such as a color film or the like arranged at a predetermined position by transfer means 51. The transfer means 51 includes guide means (not shown) for guiding the optical printer head 100 in the sub-scanning direction A, a pair of pulleys 53 on which a drive belt 52 is wound in a manner to extend therebetween, and a drive motor 54 for rotating one of the pulleys 53. The optical printer head 100 is fixed on the drive belt 52 and the drive motor 54 is driven to circulate the drive belt 52, so that the optical printer head 100 is moved in the sub-scanning direction A while being guided by the guide means. The optical printer head 100 is received in a housing (not shown) together with the record medium W. A plurality of such color films each acting as the record medium W are held at a predetermined position and outwardly discharged while being interposed between carrier rollers 55 after they are subject to writing by means of light emitted from the optical printer head.

Now, the optical printer head 100 will be described more detailedly with reference to FIGS. 16 and 17. The optical printer head 100, as shown in FIG. 16, includes a fluorescent luminous tube 101 including a plurality of luminous dots for emitting linear light and acting as a light source and a filter holder 102 for holding a red color filter R, a green color filter G and a blue color filter B thereon. The fluorescent luminous tube 101 and the filter holder 102 are housed in a housing 103. Also, the optical printer head 100 includes a selfoc lens array 104 arranged above the housing 103 for forming incident light into an erected real image at an equi-magnification.

The housing 103, as shown in FIG. 16, is provided with an opening 105, which is mounted thereon with a bottom plate 106 while the fluorescent luminous tube 101 and filter holder 102 are kept received in the housing 103, so that the housing 103 and bottom plate 106 cooperate with each other to constitute a box-like base 107. The filter holder 102 is formed with a plurality of filter holding holes 108 in parallel to each other and in a manner to extend in a main scanning direction perpendicular to the sub-scanning direction A in which the optical printer head 100 is transferred. The color filters R, G and B are held in the thus-formed filter holding holes, respectively.

The color filters R, G and B are selectively changed over by sliding the filter holder 102 along an upper surface of a glass plate 101a of the fluorescent luminous tube 101 and a wall surface of an opening 105 of the housing 103 in the sub-scanning direction indicated at arrow A in FIG. 16, so that any desired one of red, green and blue colors may be selected. The selfoc lens array 104 is provided by constructing a plurality of selfoc lenses into a single module.

Unfortunately, the conventional optical printer head 100 constructed as described above causes an end of the upper surface of the glass plate 101a of the fluorescent luminous tube 101 to tend to be caught in the filter holding holes 108 for holding the color filters R, G and B therein as shown in FIG. 17, when the filter holder 102 is slid in the sub-scanning direction A to carry out changing-over among the color filters R, G and B.

Sliding of the filter holder 102 under such circumstances causes the filter holder to be shaved to produce dust, because it is made of a resin material. The thus-produced dust adheres to a surface of the color filters R, G and B. Adhesion of the dust to the filters keeps light emitted from the fluorescent luminous tube 101 from satisfactorily permeating through the color filters R, G and B, to thereby fail to permit the light to be formed into a normal image on the color film acting as the record medium W, leading to a deterioration in quality of the image.

Also, it is needed to replace the fluorescent luminous tube 101, when the fluorescent luminous tube 101 is deteriorated in function to a degree sufficient to fail to exhibit satisfactory performance. Such replacement requires to detach the bottom plate 106 from the housing 103. However, this causes the color filters R, G and B to be exposed to an ambient atmosphere, resulting in dust contained in an ambient atmosphere adhering to the color filters R, G and B, so that quality of the image is further deteriorated.

In view of the foregoing, the inventors proposed an optical printer head which is capable of solving the above-described problems. The optical printer head is also constructed in such a manner that filters are small-sized to provide a portable optical printer. Now, the optical printer proposed will be described with reference to FIGS. 18 and 19, wherein FIG. 18 is an exploded perspective view of the optical printer head and FIG. 19 is a sectional side elevation view of the head.

The optical printer head generally designated at reference numeral 1 in FIGS. 18 and 19, as shown in FIG. 19, is so constructed that only a filter holder 2 on which red, green and blue color filters R, G and B are held is received in a housing 3. Also, the optical printer head 1 includes a selfoc lens array (hereinafter also referred to as "SLA") 4 arranged above the housing 3 so as to form incident light into an erected real image at an equi-magnification, as well as a fluorescent luminous tube 5 arranged below the housing 3 so as to act as a light source.

The housing 3, as shown in FIG. 19, is formed with an inner space 3a which is open on a side of a rear surface of the housing 3. The housing 3 has an upper wall formed with an elongated communication hole or light passage hole 6 communicating with the inner space 3a in a manner to extend in parallel to a main scanning direction perpendicular to a sub-scanning direction A, as shown in FIG. 19.

The filter holder 2, as shown in FIG. 18, includes a flat section 2a and an operation element 2b. The flat section 2a is formed thereon with three elongated filter holding holes or light passage holes 7 (7a, 7b and 7c) so as to extend in a direction of arrangement of luminous dots 5a and 5b of the fluorescent luminous tube 5 described hereinafter and in a manner to be parallel to each other at equal intervals. The filter holding holes 7 each have a width in the sub-scanning direction A formed into a size sufficient to permit light emitted from the luminous dots 5a and 5b of the fluorescent luminous tube 5 to pass therethrough. The filter holding holes 7a, 7b and 7c has the color filters R, G and B held therein, respectively. The color filters R, G and B permit lights at predetermined wavelengths or red light, green light and blue light to permeate therethrough, respectively. The operation element 2b is connected to a drive mechanism (not shown) to slide the filter holder 2 in the sub-scanning direction A. The filter holder 2 is received in the inner space 3a of the housing while positioning any one of the color filters R, G and B above the luminous dots 5a and 5b of the fluorescent luminous tube 5 described below.

The housing 3, as shown in FIG. 19, is mounted on the opening of the inner space 3a thereof with a bottom plate 8 while receiving the filter holder 2 therein, so that the housing 3 and bottom plate 8 cooperate with each other to constitute a box-like base 9. The housing 3 has side surfaces acting to regulate a width of sliding movement of the filter holder 2. One of the side surfaces of the housing 3 is formed with a hole 3b through which the operation element 2b of the filter holder 2 is inserted. The filter holder 2 is abutted on one side surface thereof against a bottom surface of the housing 3 and on the other surface thereof against the bottom plate 8. The bottom plate 8 is formed with an elongated through-hole or light passage hole 10 in a manner to extend in the main scanning direction perpendicular to the sub-scanning direction A and be opposite to the communication hole 6, resulting in light emitted from the fluorescent luminous tube 5 being guided therethrough.

Selective changing-over among the red, green and blue color filters R, G and B is carried out by sliding the filter holder 2 along a wall surface of the space 3a in the sub-scanning direction indicated at the arrows A in FIG. 19.

The selfoc lens array or SLA 4 acting as image formation means is provided by constructing a plurality of the selfoc lenses 4a into a single module. The SLA 4 is formed by integratedly arranging the selfoc lenses 4a with high precision while rendering central axes 4b of the selfoc lenses 4a parallel to each other. The SLA 4 is then fixed on a circumference thereof to a frame plate 4c to constitute an optical element while being mounted on the housing 3 in a manner to be positioned above the communication hole 6 of the housing 3. The SLA 4 has an incident surface 4d located within a region of the communication hole 6 and facing the luminous dots 5a and 5b of the fluorescent luminous tube 5, to thereby form a light path in a direction perpendicular to the sub-scanning direction A. The selfoc lenses 4a each are formed into a substantially column-like shape and has a refraction index distributed in a manner to be parabolically reduced from the central axis 4b to an outer peripheral surface thereof.

The fluorescent luminous tube 5, as shown in FIG. 18, is constituted by a rectangular substrate 11 made of a light-permeable and insulating glass material and a box-like casing sealedly joined to the substrate 11, resulting in providing an envelope 13 of a substantially parallelepiped shape, which is evacuated at a high vacuum. The substrate 11 is formed on an inner surface thereof with a plurality of the luminous dots 5a and 5b acting as a luminous section, which are arranged in rows in a manner to be spaced from each other at predetermined intervals. In FIG. 18, the luminous dots are arranged in two rows in an offset or staggered manner. The luminous dots 5a and 5b each include an anode conductor and a phosphor layer of ZnO:Zn or the like deposited on the anode conductor. The luminous dots 5a and 5b are located within a region of the communication hole 6 and though-hole 10. The luminous dots 5a and 5b are juxtaposed to each other in the main scanning direction perpendicular to the sub-scanning direction A shown in FIG. 19 in which the optical printer head 1 is moved.

The optical printer head also includes filamentary cathodes (not shown) arranged below the luminous dots 5a and 5b so as to extend in the main scanning direction. The anode conductors of the luminous dots 5a and 5b are led out of the envelope 13 in a manner to be independent from each other and separately driven due to feeding of a drive signal thereto.

The fluorescent luminous tube 5 is so constructed that each of the luminous dots 5a and 5b and the central axis 4b of each of the selfoc lenses 4a are arranged in correspondence to each other so as to form a pair. The fluorescent luminous tube 5 thus constructed is detachably mounted on an outer surface of the bottom plate 8 using any suitable fixing means such as screws or the like while being received in a frame-like container 14 for the fluorescent luminous tube 5.

In the optical printer head 1 shown in FIGS. 18 and 19, when a width of the filter holding holes 7 defined in the sub-scanning direction A is set to be minimum while permitting light emitted from the luminous dots 5a and 5b of the fluorescent luminous tube 5 to permeate therethrough, a stroke of movement of the filter holder 2 can be reduced. This permits the optical printer head 1 to be small-sized to a degree sufficient to render the optical printer portable.

However, it was found that a reduction in width of the filter holding holes 7 in the sub-scanning direction causes serious problems.

More particularly, the selfoc lenses 4a of the SLA 4 of the optical printer head 1 each have optical characteristics which permit light incident at a maximum allowable incident angle $\theta$ predetermined for every lens in a direction of the central axis 4b of the selfoc lens 4a with respect to an incident surface 4d of the lens facing each of the luminous dots 5a and 5b of the fluorescent luminous tube 5 to be formed into an erected real image at an equi-magnification. The maximum allowable incident angle $\theta$ indicates an incident angle which permits light reaching the incident surface 4d of the SLA 4 to be incident on the SLA 4. For example, the maximum allowable incident angle $\theta$ is set to be 9° in an SLA-9, 12° in an SLA-12 and 20° in an SLA-20.

Thus, as shown in FIG. 20, when light emitted from the luminous dots 5a and 5b of the fluorescent luminous tube 5 acting as the luminous section is incident on the incident surface 4d of the SLA 4 within the maximum allowable incident angle $\theta$, it is formed into an erected real image at an equi-magnification on the record medium or photosensitive medium such as a color film or the like positioned above the SLA 4. Thus, dot-like light emitted from the luminous dots 5a and 5b acting as the luminous section reaches the record medium W as it stands, resulting in a luminous dot image I being formed on the record medium. On the contrary, light incident on the incident surface 4d while being out of the maximum allowable incident angle $\theta$ fails to form an erected real image at an equi-magnification.

In FIG. 21, supposing that, of regions in which light is reflected by or on a peripheral surface of the filter holding hole 7 acting as the light passage hole, a region in which light is incident on the incident surface 4d within the maximum allowable incident angle θ constitutes a reflection region S as shown in FIG. 21; a portion of the peripheral surface of the filter holding hole 7 defined on a side of the fluorescent luminous tube 5 on the basis of the color filters R, G and B provides the reflection region S. In this instance, of light emitted from the luminous dots, light which is incident and reflected on the reflection region S is regarded as if it is directly incident on the incident surface 4d from a virtual luminous section 5c, resulting in generating a ghost g at a position apart from a luminous dot image I shown in FIG. 20.

The ghost g thus produced is increased in brightness or luminance in proportion to the real image, so that a bright flare-like portion appears in the form of an image on the record medium W, to thereby directly affect the image formed on the record medium W, leading to a deterioration in quality of the image.

In the optical printer head 1 constructed as described above, alignment between a center of the color filter R (G or B) and a light axis of the SLA 4 keeps light reflected on the peripheral wall of the filter holding hole 7 on a side of the SLA 4 on the basis of the color filters R, G and B from being incident on the incident surface 4d of the SLA 4 within the maximum allowable incident angle θ.

The filter holder 2 is arranged so as to be movable in the sub-scanning direction A for selection of any one of the filters R, G and B. Such arrangement of the filter holder 2, as shown in FIG. 22, often causes the filter holding hole 7 to be somewhat deviated in the sub-scanning direction A from the central axis of the selfoc lens 4a due to a mechanical movement error. In this instance, the reflection region S in which light is incident on the incident surface 4d of the SLA 4 within the maximum allowable incident angle θ is likewise displaced to another reflection region S'. In FIG. 22, a portion of the peripheral surface of the filter holding hole 7 on the side of the SLA 4 on the basis of the color filters R, G and B defines the reflection region S'.

When light emitted from the luminous dot 5a is incident on the reflection region S', the light reflected is caused to be incident on the incident surface 4d of the SLA 4 within the maximum allowable incident angle θ. This results in the light being likewise regarded as if it is directly incident on the incident surface 4d from a virtual luminous section 5c', to thereby produce a ghost, which directly affects an image formed on the record medium W, leading to a deterioration in quality of the image.

Thus, when light emitted from the luminous dots 5a and 5b of the fluorescent luminous tube 5 is reflected by or on the outer periphery of the filter holding hole 7 and then incident on the incident surface 4d within the maximum allowable incident angle θ, the ghost g is formed at a position deviated from the proper image formation position, to thereby cause a deterioration in quality of the image formed. Also, light emitted from the luminous dots 5a and 5b of the fluorescent luminous tube 5 is repeatedly reflected by or on the peripheral surface of the filter holding hole 7, so that the light reflected forms background light, to thereby cause a region other than the luminous dot image I to be increased in brightness or luminance, resulting in contrast of the image being reduced as a whole.

SUMMARY OF THE INVENTION

The present invention has been made in view of the foregoing disadvantage of the prior art.

Accordingly, it is an object of the present invention to provide an optical printer head which is capable of minimizing generation of a ghost due to incidence of reflected light on a selfoc lens array, to thereby enhance quality of an image.

It is another object of the present invention to provide an optical printer head which is capable of keeping light from being repeatedly reflected by or on a peripheral surface of a filter holding hole, to thereby prevent a reduction in contrast of a luminous dot image due to an increase in brightness of a region other than the image by the reflected light acting as background light.

It is another object of the present invention to provide an optical printer head which is capable of minimizing generation of a ghost due to incidence of reflected light on a selfoc lens array, to thereby prevent a reduction of contrast, leading to an increase in quality of an image, even when positional deviation of a filter holding hole occurs due to a mechanical error during movement of a filter holder for changing-over among filters.

In accordance with the present invention, an optical printer head is provided. The optical printer head includes a box-like base having a pair of light passage holes formed through walls thereof opposite to each other, a filter holder formed with a plurality of filter holding holes in a manner to be spaced from each other at predetermined intervals, and filters formed so as to be different in permeation wavelength and held in the filter holding holes, respectively.

The filter holder is received in the base in a manner to be movable therein and moved so as to position any desired one of the filters on a light path defined between the light passage holes. The optical printer head also includes a light source arranged on an outside of one of the walls of the base and image formation means arranged on an outside of the other of the walls of the base in a manner to be opposite to the light source to form light incident on an incident surface thereof within a predetermined maximum allowable incident angle into an image on a record medium. The filter holding holes each include a peripheral surface having a portion which permits light emitted from the light source to be reflected thereon at an angle out of the maximum allowable incident angle. Thus, image formation on the record medium is carried out in synchronism with movement of the optical printer head relative to the record medium.

In a preferred embodiment of the present invention, the peripheral surface of the filter holding hole is so formed that a portion thereof positioned on a side of the light source is formed into a reflective surface increased in diameter as compared with a portion thereof positioned on a side of the image formation means.

In a preferred embodiment of the present invention, the reflective surface is inclined at an angle equal to or larger than the maximum allowable incident angle.

In a preferred embodiment of the present invention, the portion of the peripheral surface of the filter holding hole on the side of the light source is provided in the form of a scattering surface for subjecting light incident thereon to irregular reflection.

In a preferred embodiment of the present invention, the reflective surface is provided in the form of a scattering surface for subjecting light incident thereon to irregular reflection.

In a preferred embodiment of the present invention, the scattering surface has reflectance of 60% or less.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 18:
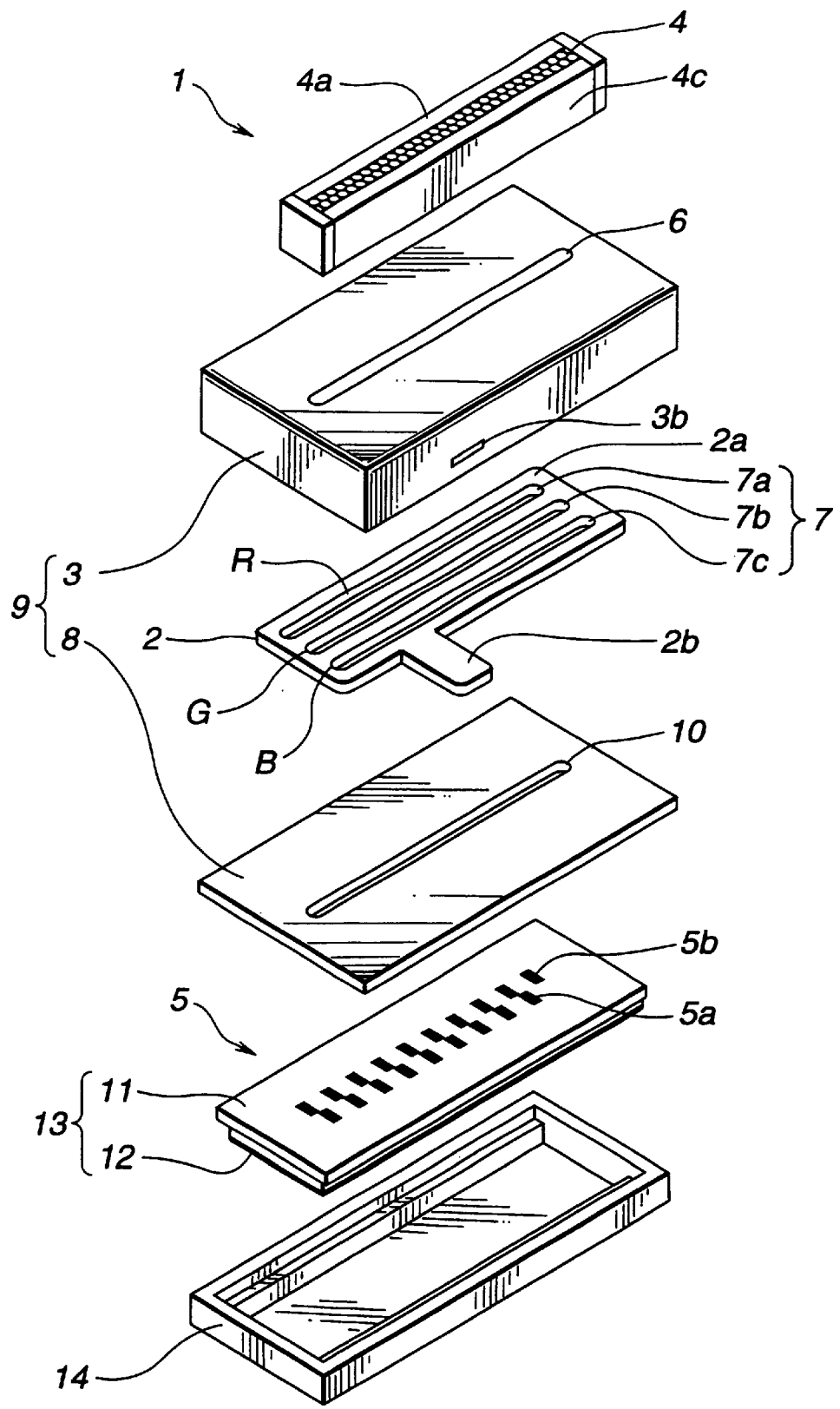
FIG. 18 is an exploded perspective view showing another convention optical printer head.
Figure 19:
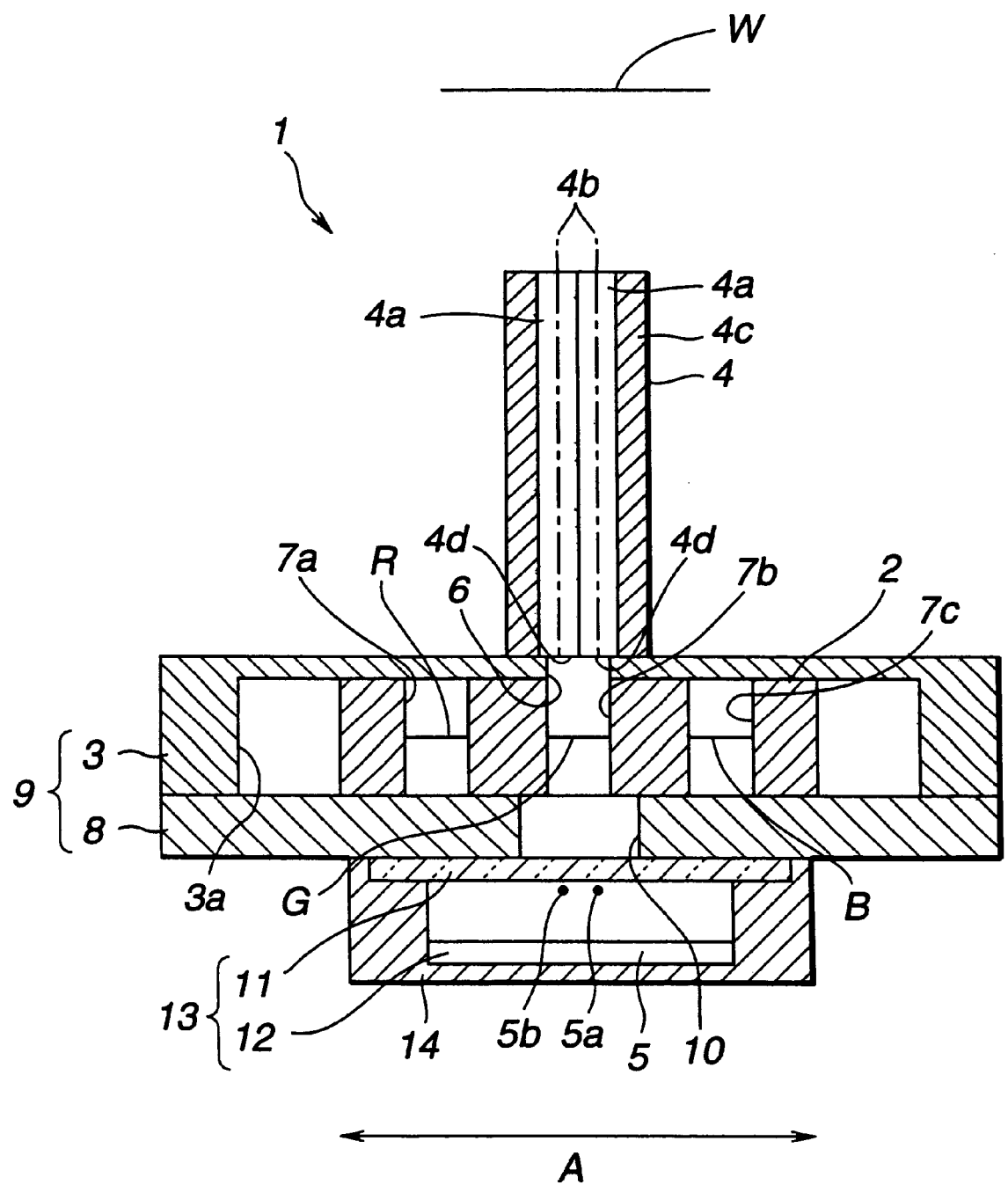
FIG. 19 is a sectional side elevation view of the optical printer head shown in FIG. 18.
Figure 20:
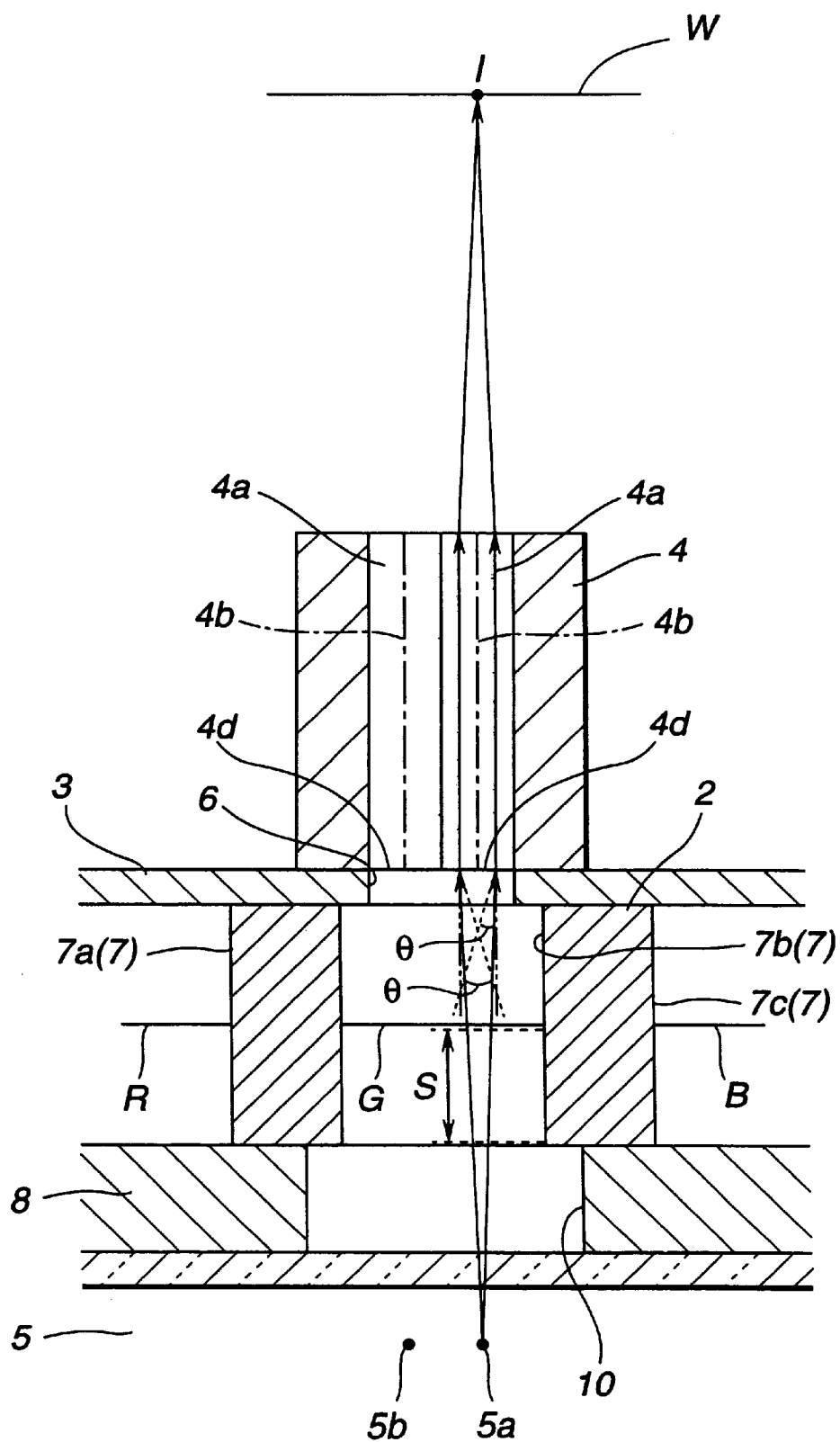
FIG. 20 is a fragmentary enlarged sectional side elevation view of the optical printer head shown in FIG. 19 which shows formation of light emitted from a light source into an image on a record medium.
Figure 21:
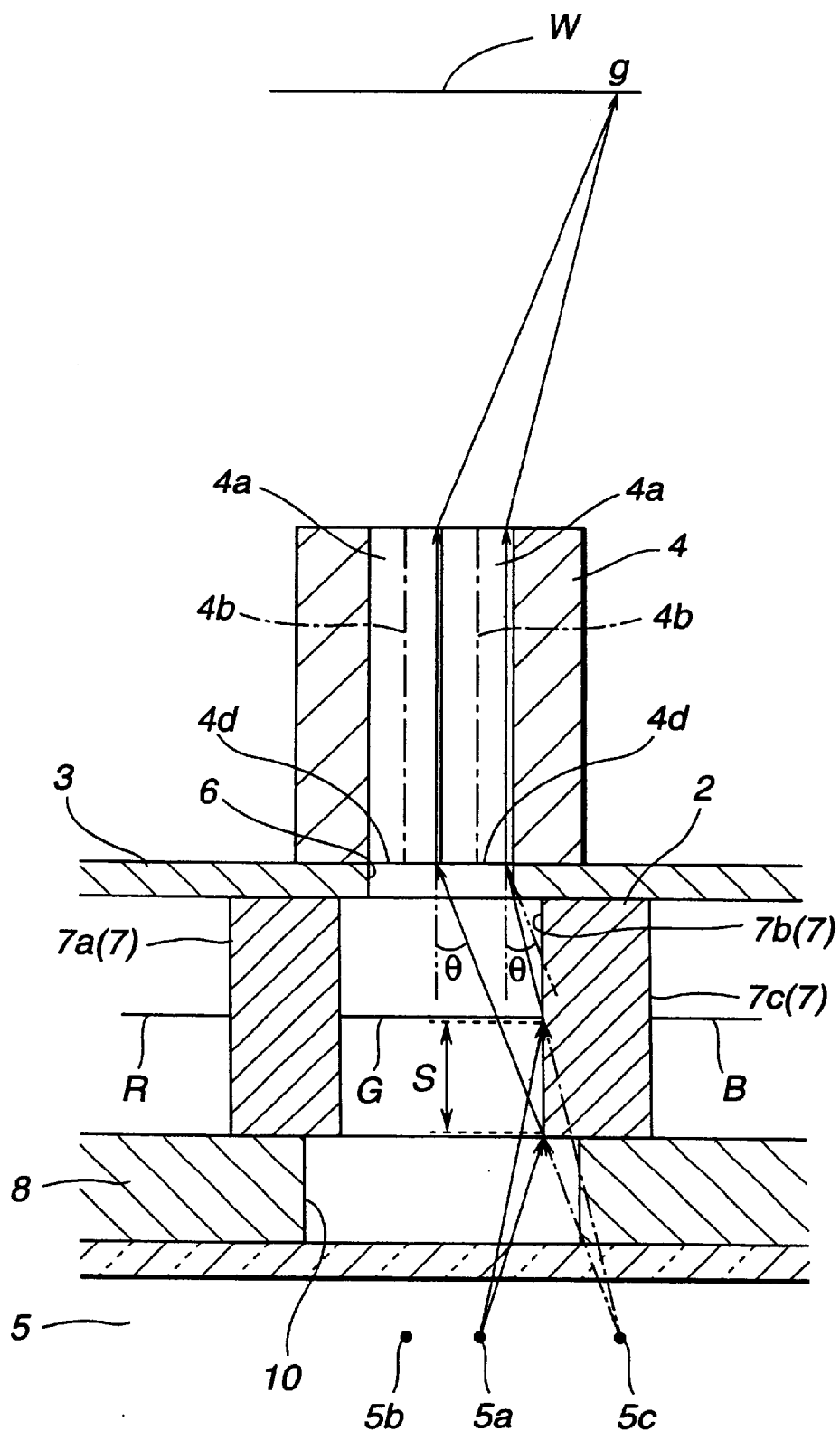
FIG. 21 is a fragmentary enlarged sectional side elevation view of the optical printer head shown in FIG. 19 which shows generation of a ghost on a record medium.
Figure 22:
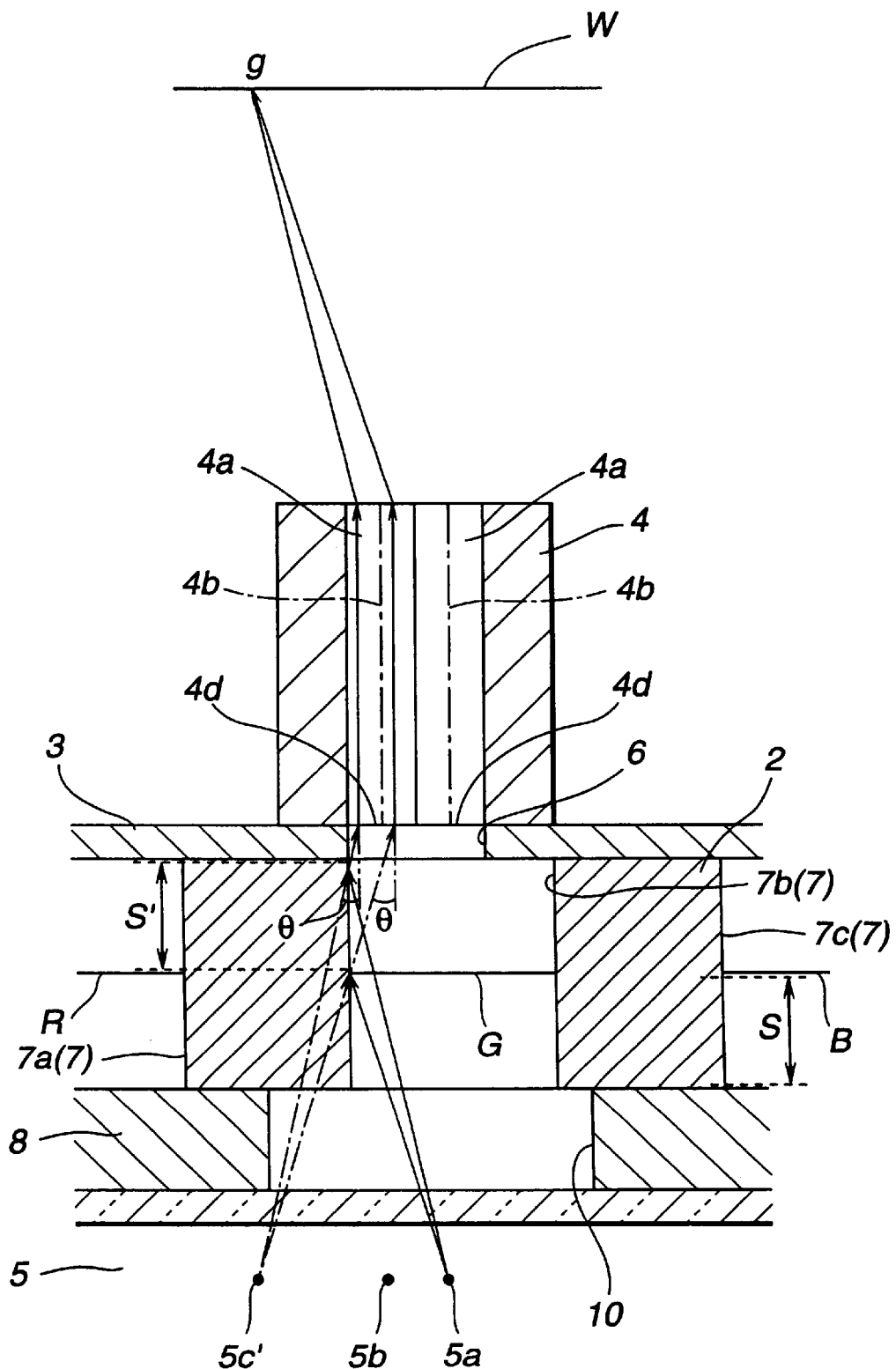
FIG. 22 is a fragmentary side elevation view of the optical printer head shown in FIG. 19, which shows deviation of a color filter from an optical axis of a selfoc lens.

Now, an optical printer head according to the present invention will be described hereinafter with reference to FIGS. 1 to 14. In FIGS. 1 to 14, reference characters like those in FIGS. 18 and 19 designates like or corresponding parts.

Figure 1:
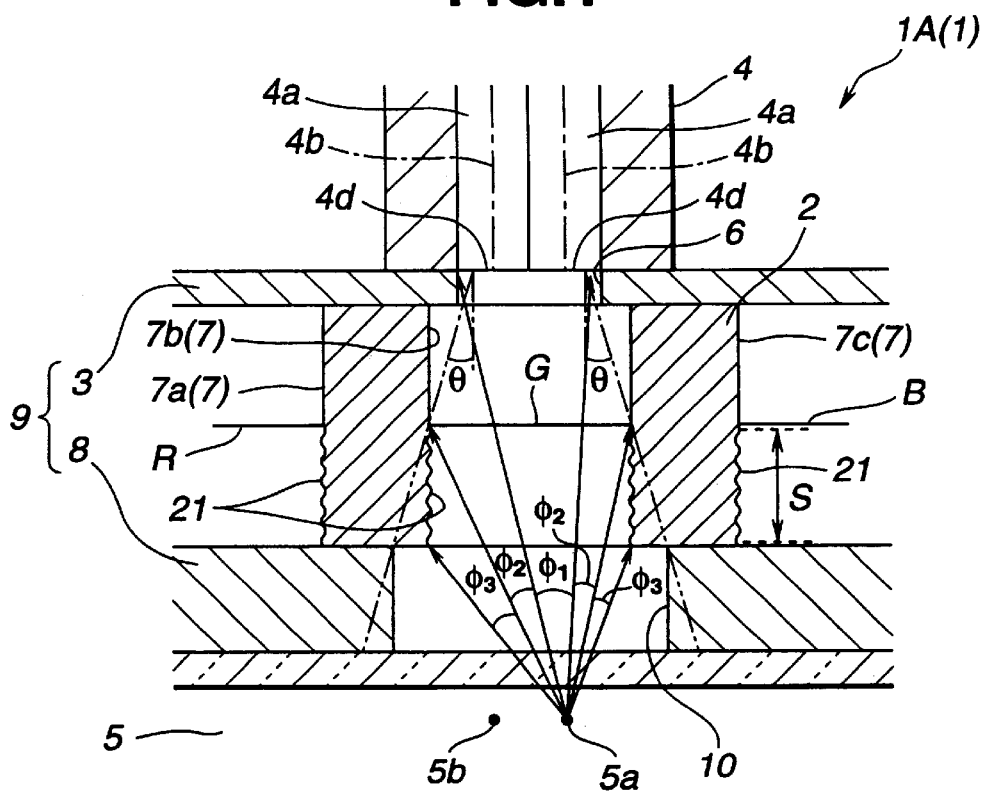
FIG. 1 is a fragmentary enlarged sectional view showing a first embodiment of an optical printer head according to the present invention.
Figure 2:
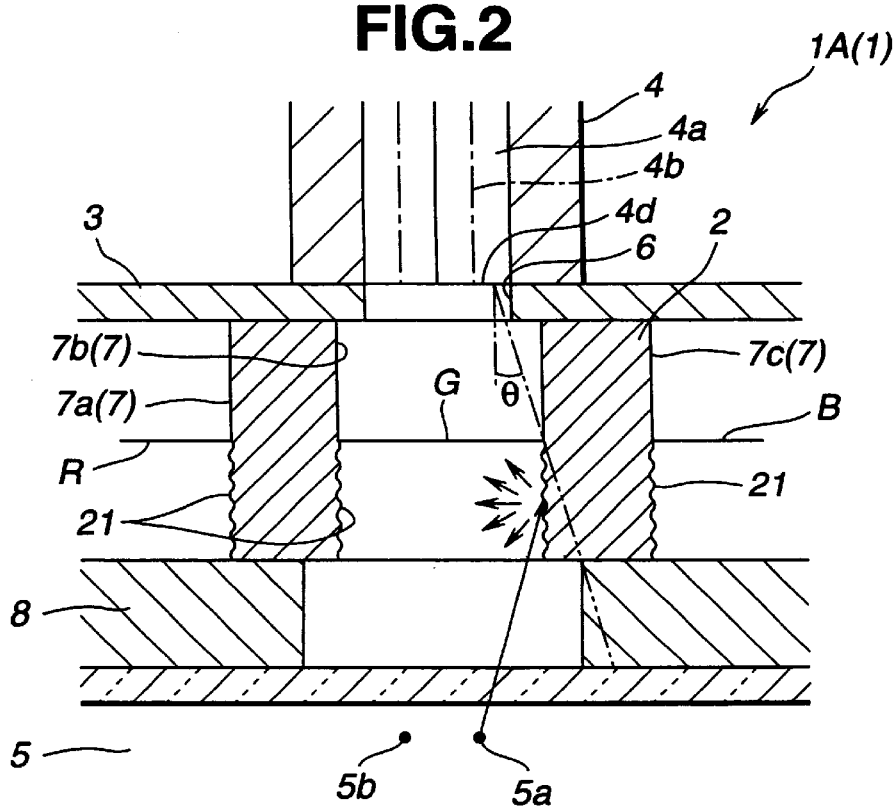
FIG. 2 is a fragmentary enlarged sectional view of the optical printer head shown in FIG. 1.

Referring first to FIGS. 1 and 2, a first embodiment of an optical printer head according to the present invention is illustrated. An optical printer head of the illustrated embodiment generally designated at reference numeral 1A (1) is so constructed that a peripheral surface of a reflection region (first reflection region) S of each of filter holding holes 7 which generates a ghost in the conventional optical printer head described above with reference to FIG. 19 forms a scattering surface 21. The scattering surface 21 may be constituted by a rough surface formed by sandblasting. The rough surface is formed so as to have reflectance of 60% or less based on a smooth surface. The scattering surface 21 carries out irregular reflection of light incident thereon from luminous dots 5a and 5b of a fluorescent luminous tube 5.

In the optical printer head 1A including the scattering surface 21, a filter holder 2 is slid in a sub-scanning direction A to set a center of a color filter which permits a desired color to permeate therethrough (a color filter G in FIGS. 1 and 2) on an optical axis of a selfoc lens array (SLA) 4. Under such condition, the luminous dots 5a and 5b of the fluorescent luminous tube 5 are driven to emit light. In FIGS. 1 and 2, light emitted from the luminous dots 5a and 5b of the fluorescent luminous tube 5 is omitted for the sake of brevity.

Of light emitted from the luminous dots 5a and 5b of the fluorescent luminous tube 5, light emitted in a range of a radiant angle φ1 directly reaches an incident surface 4d of the SLA 4 as shown in FIG. 1. At this time, light incident on the incident surface 4d within a maximum allowable incident angle θ passes through the SLA 4 to form an erected real image at an equi-magnification on a record medium W. On the contrary, light which reaches the incident surface 4d out of the maximum allowable incident angle θ fails to be incident on the SLA 4.

Of light emitted from the luminous dots 5a and 5b of the fluorescent luminous tube 5, light emitted in a range of a radiant angle φ2 is kept from being incident within the maximum allowable incident angle θ, to thereby be irrelevant to production of a ghost.

Of light emitted from the luminous dots 5a and 5b of the fluorescent luminous tube 5, light emitted in a range of a radiant angle φ3 is incident on the scattering surface 21. The light incident on the scattering surface 21, as shown in FIG. 2, is subject to irregular reflection on the scattering surface 21 roughed, resulting in the amount of light incident on the SLA 4 being reduced. This permits a ghost due to reflection by or on the scattering surface 21 to be reduced to a degree sufficient to be kept from affecting quality of an image.

Referring now to FIGS. 3 to 10, a second embodiment of an optical printer head according to the present invention is illustrated. In an optical printer head of the illustrated embodiment generally designated at reference characters 1B (1), a portion of a peripheral surface of each of filter holding holes 7 corresponding to a first reflection region S provides a first reflection surface 22 of an increased diameter with respect to a portion of the peripheral surface of the filter holding hole 7 on a side of an selfoc lens array or SLA 4 on the basis of color filters R, G and B. The first reflection surfaces 22 each may constitute a first diameter-increased reflection surface 22a shown in FIGS. 3 to 5 or a first inclined surface 22b shown in FIGS. 6 to 8.

Figure 3:
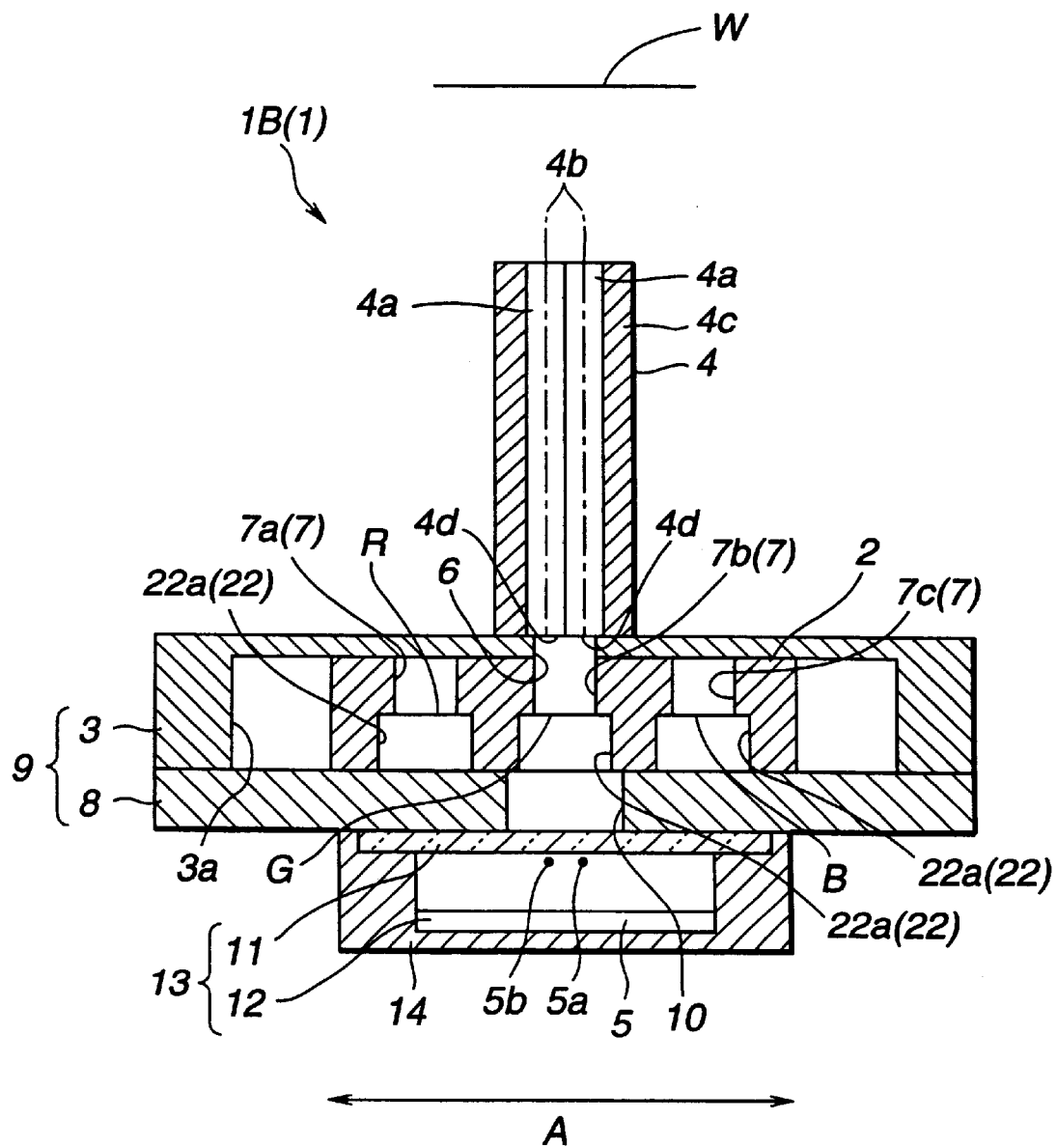
FIG. 3 is a sectional view showing a second embodiment of an optical printer head according to the present invention, which includes first diameter-increased reflection surfaces.
Figure 4:
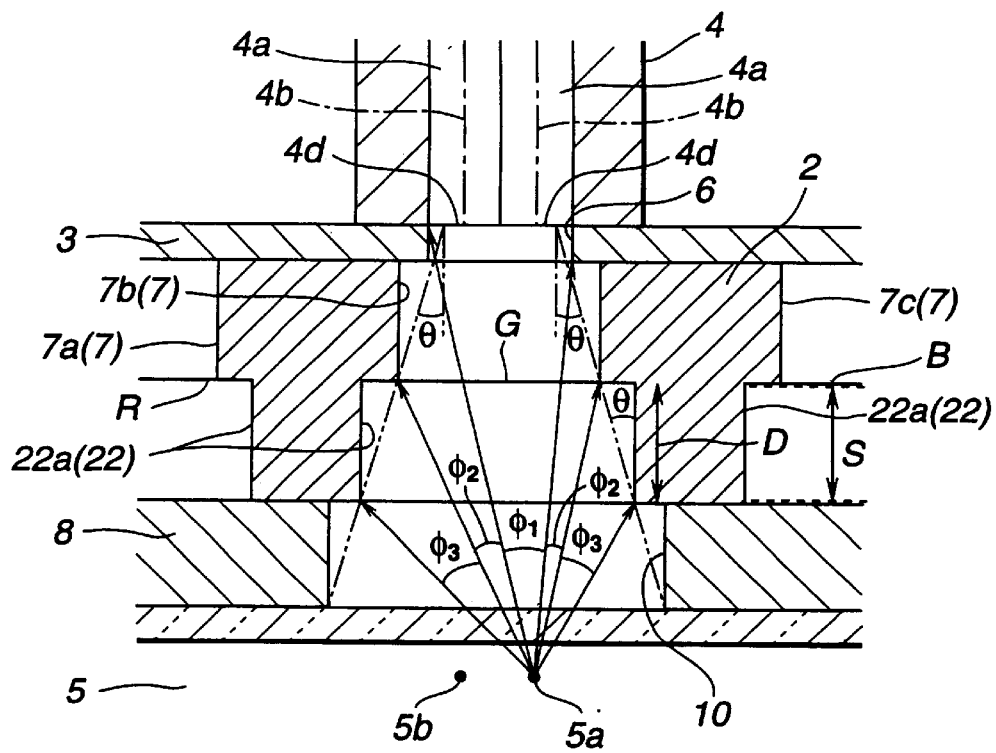
FIG. 4 is a fragmentary enlarged sectional view showing a second embodiment of an optical printer head according to the present invention, which includes first diameter-increased reflection surfaces.
Figure 5:
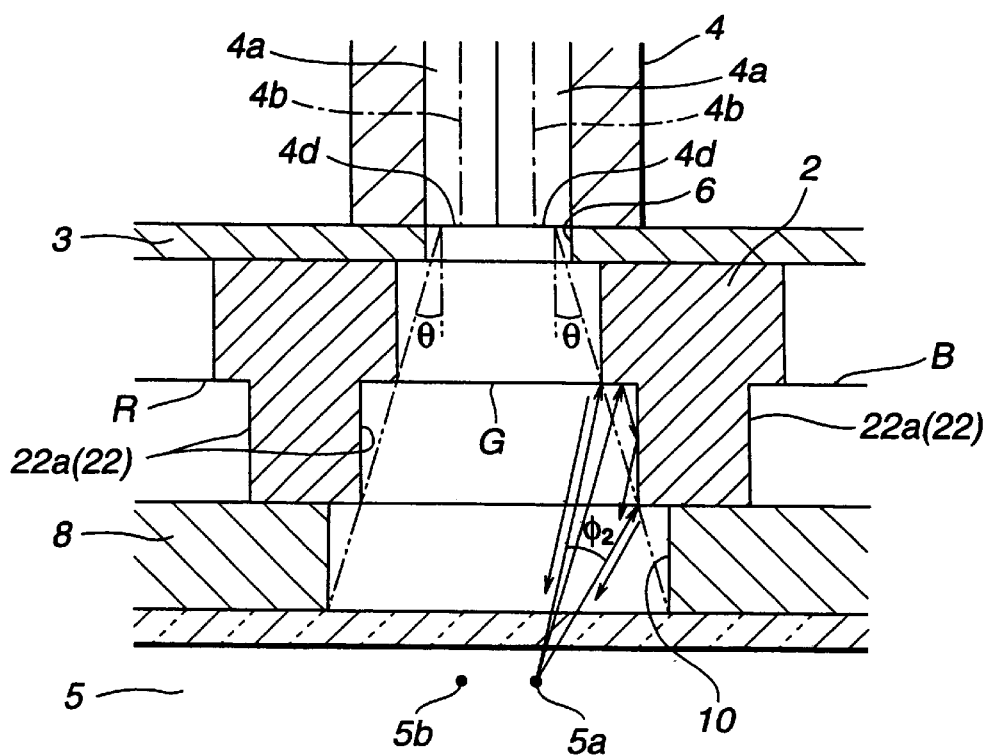
FIG. 5 is a fragmentary enlarged sectional view showing a second embodiment of an optical printer head according to the present invention, which includes first diameter-increased reflection surfaces.

The first diameter-increased reflection surfaces 22a, as shown in FIGS. 3 to 5, each are defined by the portion of the peripheral surface of the filter holding hole 7 on the side of the fluorescent luminous tube 5 on the basis of the color filters R, G and B and formed into a diameter increased as compared with a portion of the peripheral surface of the filter holding hole 7 on a side of the SLA 4 on the basis of the color filters R, G and B. Thus, a diameter of the first diameter-increased reflection surface 22a, when a length thereof in a direction of a light path is indicated at D, is formed to be larger by D. tan θ or more than a diameter of the peripheral surface of the filter holding hole or light passage hole 7.

In the optical printer head 1B formed with the first diameter-increased reflection surfaces 22a, light is emitted from luminous dots 5a and 5b of the fluorescent luminous tube 5. As shown in FIG. 4, of light emitted in a range of a radiant angle φ1, light incident on an incident surface 4d of the SLA 4 within a maximum allowable incident angle θ permeates through the SLA 4 and then forms an image on a record medium W. Light reaching the incident surface 4d of the SLA 4 out of the maximum allowable incident angle θ is kept from being incident on the SLA 4.

Of light emitted from the luminous dots 5a and 5b of the fluorescent luminous tube 5, light emitted in a range of a radiant angle φ2 is kept from being incident on the incident surface 4d within the maximum allowable incident angle θ, resulting in being irrelevant to production of a ghost.

Of light emitted from the luminous dots 5a and 5b of the fluorescent luminous tube 5, light emitted in a radiant angle φ3, as shown in FIG. 5, is repeatedly reflected by or on the first diameter-increased reflection surface 22a, to thereby be out of the maximum allowable incident angle θ. This effectively prevents production of a ghost g.

Figure 6:
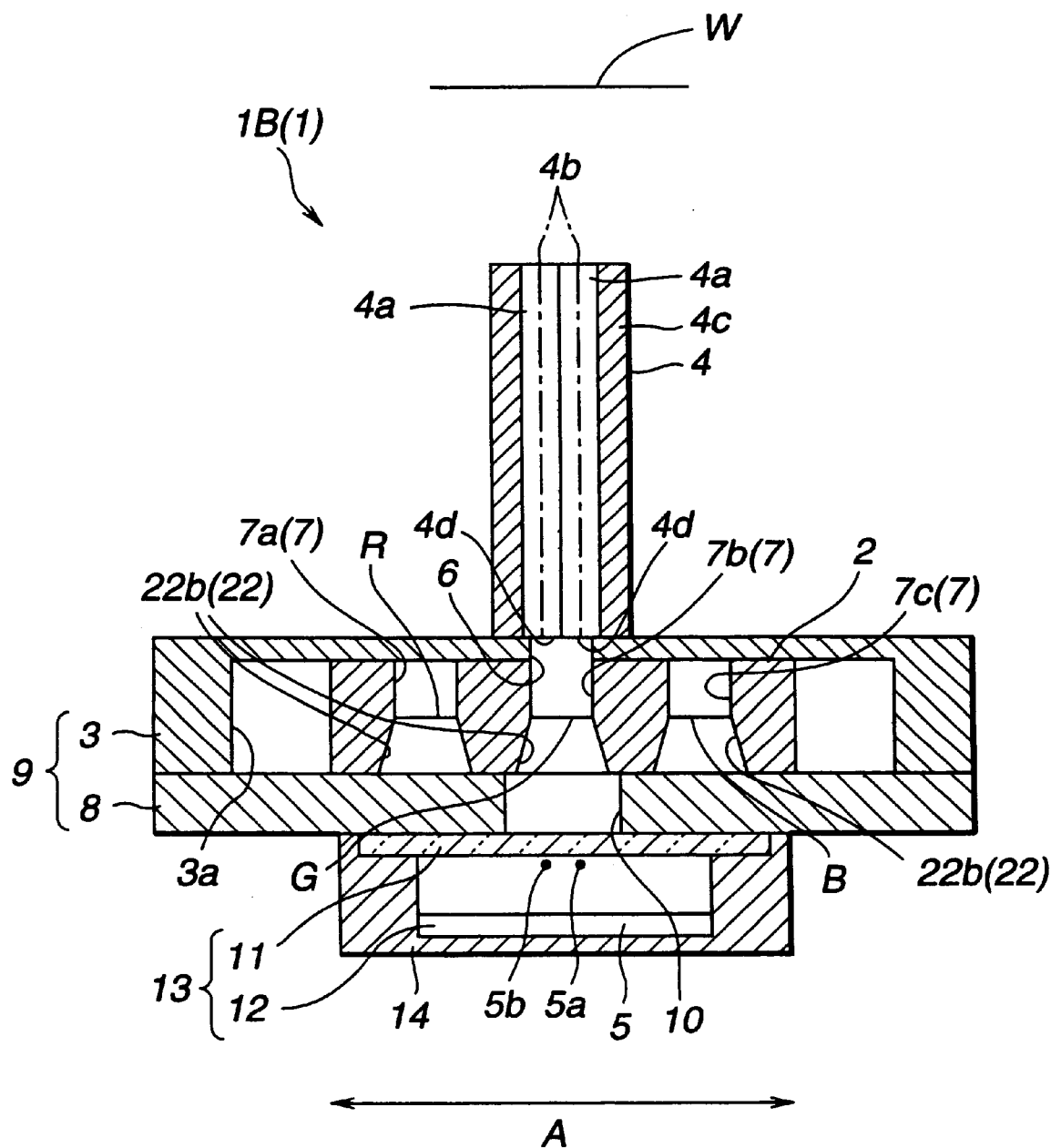
FIG. 6 is a sectional view showing a second embodiment of an optical printer head according to the present invention, which includes first inclined surfaces.
Figure 7:
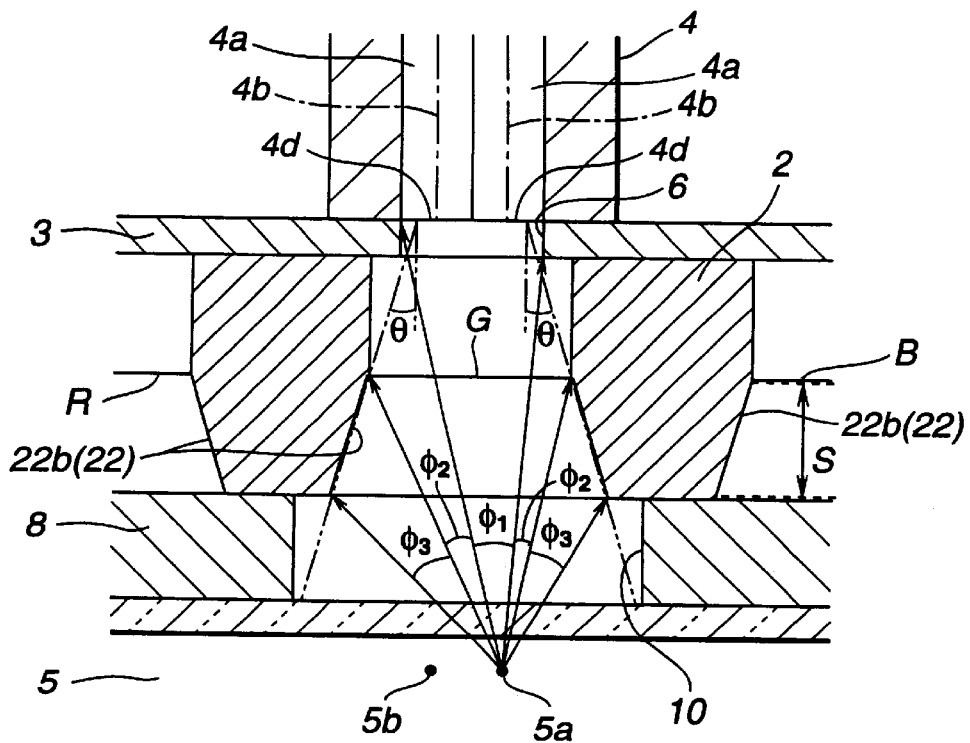
FIG. 7 is a fragmentary enlarged sectional view showing a second embodiment of an optical printer head according to the present invention, which includes first inclined surfaces.
Figure 8:
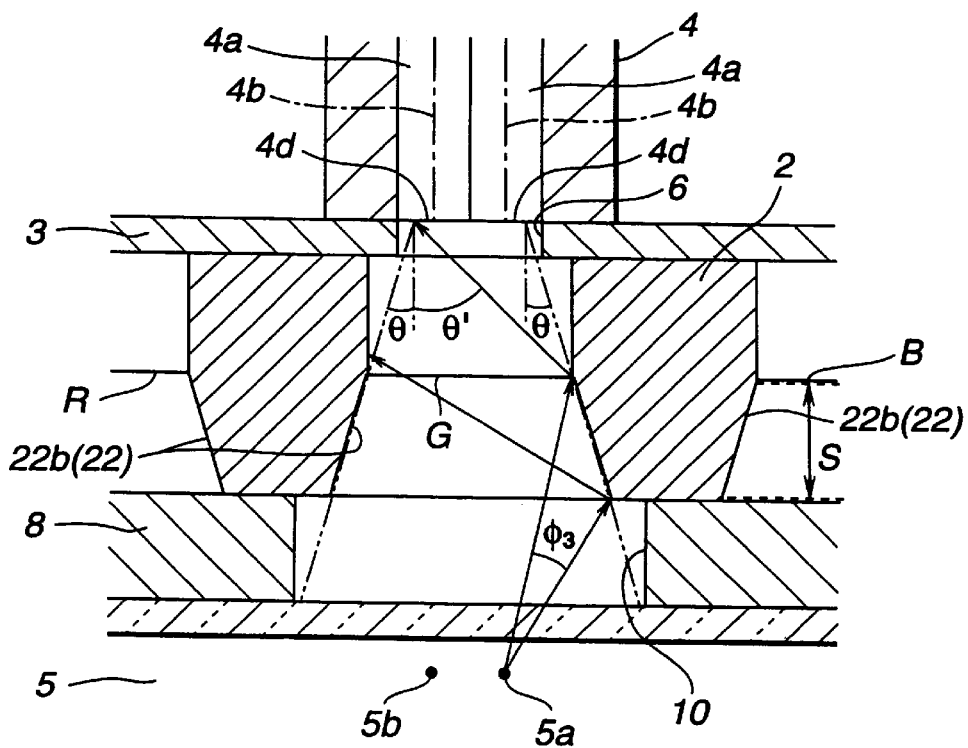
FIG. 8 is a fragmentary enlarged sectional view showing a second embodiment of an optical printer head according to the present invention.

The first inclined surfaces 22b, as shown in FIGS. 6 to 8, each are constituted by a portion of the peripheral surface of the filter holding hole 7 on a side of the fluorescent luminous tube 5 based on the color filters R, G and B and inclined at a predetermined angle so as to enlarge or spread toward the fluorescent luminous tube 5 from a position at which the color filters R, G and B are mounted. An inclination angle of the first inclined surface 22b is set to be equal to or larger than the maximum allowable incident angle θ of the SLA 4. More specifically, supposing that the first inclined surface 22b has any optional diameter width E, the inclined surface is formed so as to be larger by E. sin θ than the portion of the peripheral surface of the filter holding hole 7 on the side of the SLA 4 based on the color filters R, G and B.

In the optical printer head 1B provided with the first inclined surfaces 22b, light is likewise emitted from the luminous dots 5a and 5b of the fluorescent luminous tube 5. As shown in FIG. 7, of light emitted in a range of a radiant angle φ1, light incident on the incident surface 4d of the SLA 4 within the maximum allowable incident angle θ passes through the SLA 4 and then forms an image on the record medium W. Light reaching the incident surface 4d out of the maximum allowable incident angle θ fails to be incident on the SLA 4.

Of light emitted from the luminous dots 5a and 5b of the fluorescent luminous tube 5, light emitted in a range of a radiant angle φ2 is kept from being incident within the maximum allowable incident angle θ, to thereby be irrelevant to production of a ghost.

Of light emitted from the luminous dots 5a and 5b of the fluorescent luminous tube 5, light emitted in a range of a radiant angle φ3, as shown in FIG. 8, is reflected by or on the first inclined surface 22b, to thereby be kept from being incident within the maximum allowable incident angle θ. Thus, light reaching the incident surface 4d of the SLA 4 has an incident angle θ'. The incident angle θ' is larger than the maximum allowable incident angle θ, resulting in being kept from being incident on the incident surface 4d. This eliminates generation of a ghost due to reflection on the first inclined surface 22b.

Figure 9:
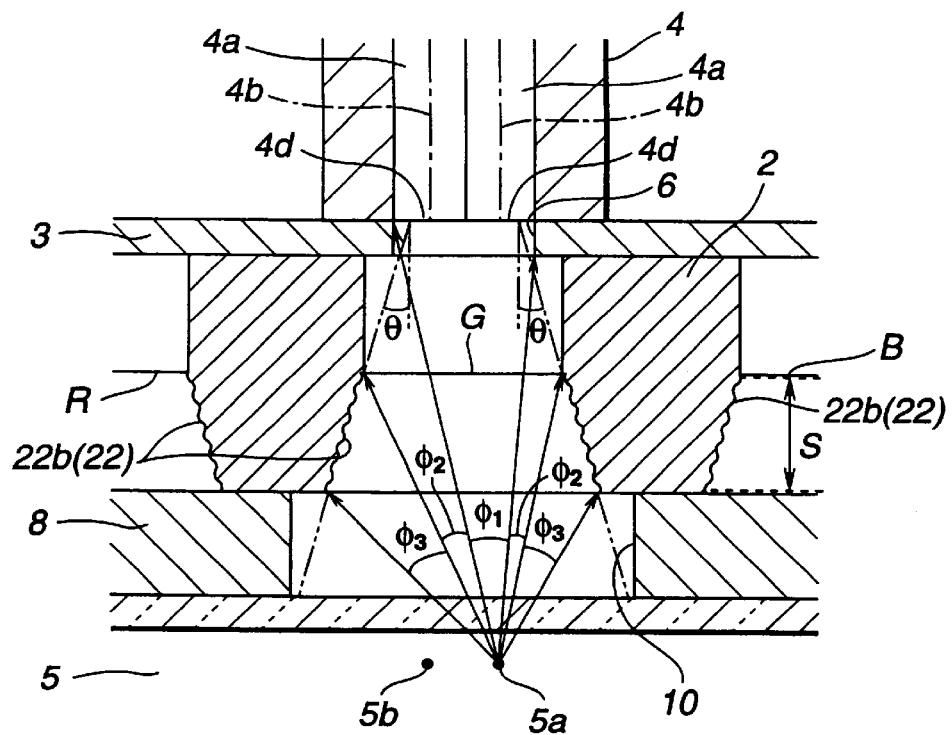
FIG. 9 is a fragmentary enlarged sectional view showing a second embodiment of an optical printer head according to the present invention, wherein first inclined surfaces each are roughed.
Figure 10:
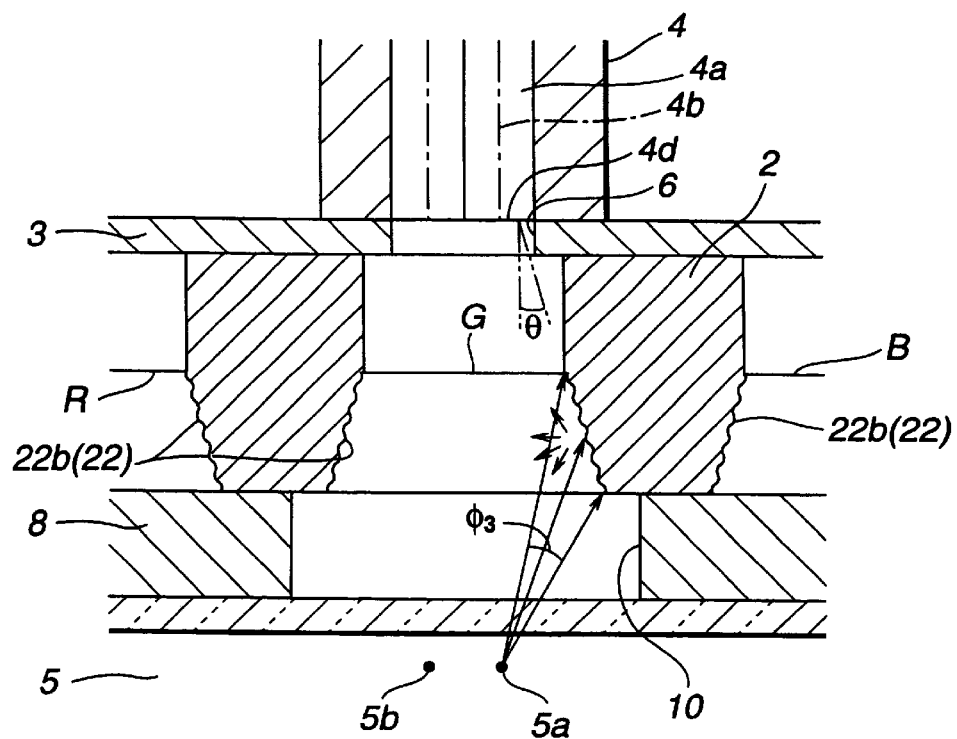
FIG. 10 is a fragmentary enlarged sectional view showing a second embodiment of an optical printer head according to the present invention, wherein first inclined surfaces each are roughed.

The first inclined surfaces 22b each may be rendered rough as shown in FIG. 9. Alternatively, the first inclined surface 22b may be formed into a step-like shape. Thus, of light emitted from the luminous dots 5a and 5b of the fluorescent luminous tube 5, light emitted in a range of the radiant angle φ3 is incident on the rough or step-like first inclined surface, to thereby be scattered. This prevents repeated reflection by or on the peripheral surface of the light passage hole 7, to thereby prevent a reduction in contrast by background light.

Referring now to FIGS. 11 to 14, a third embodiment of an optical printer head according to the present invention is illustrated. An optical printer head 1C (1) of the illustrated embodiment is so constructed that a portion of a peripheral surface of a filter holding hole or light passage hole 7 on a side of a selfoc lens array or SLA 4 based on color filters R, G and B provides a second diameter-increased reflection surface 23.

Figure 11:
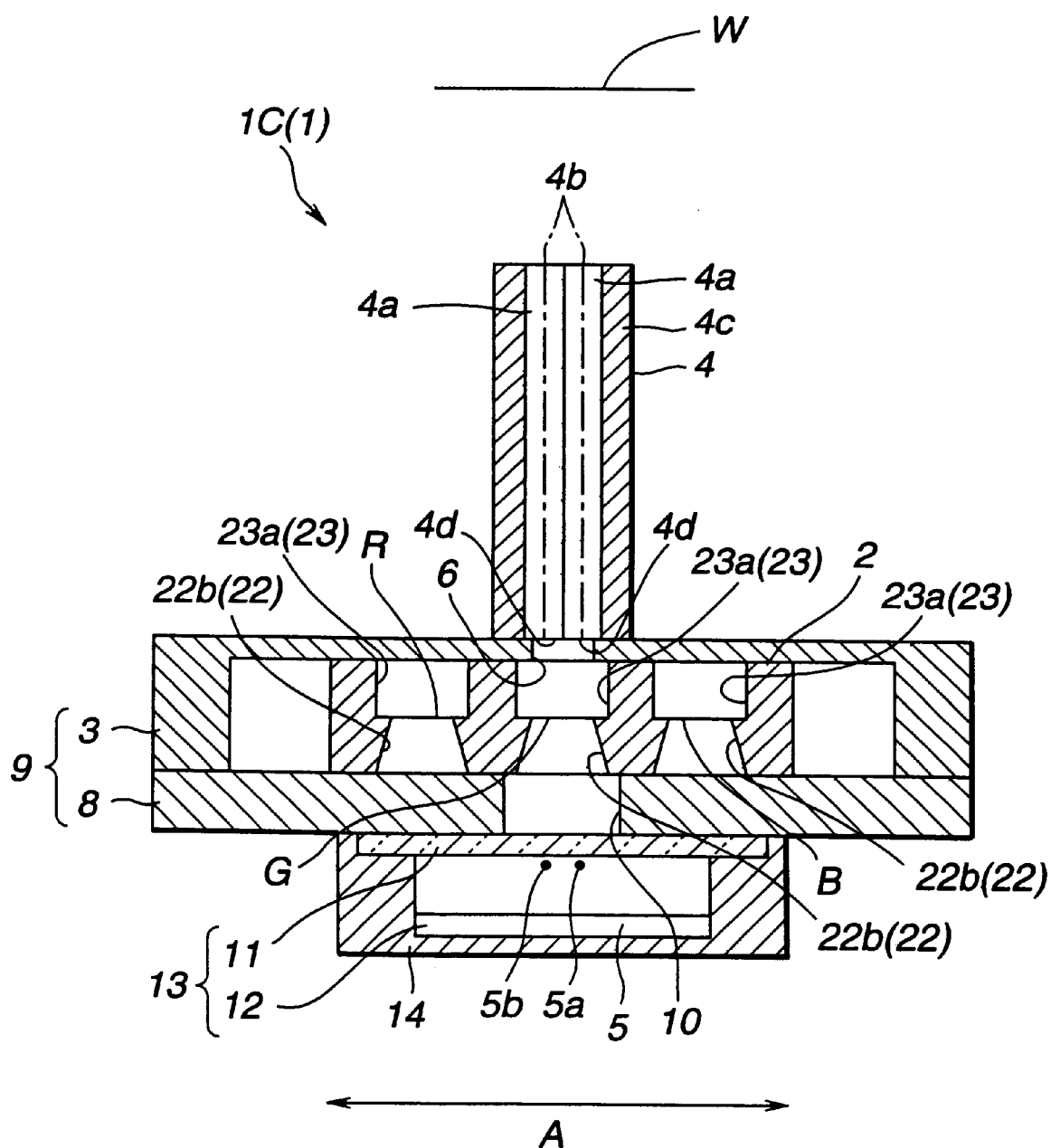
FIG. 11 is a sectional view showing a third embodiment of an optical printer head according to the present invention, which includes second diameter-increased reflection surfaces.
Figure 12:
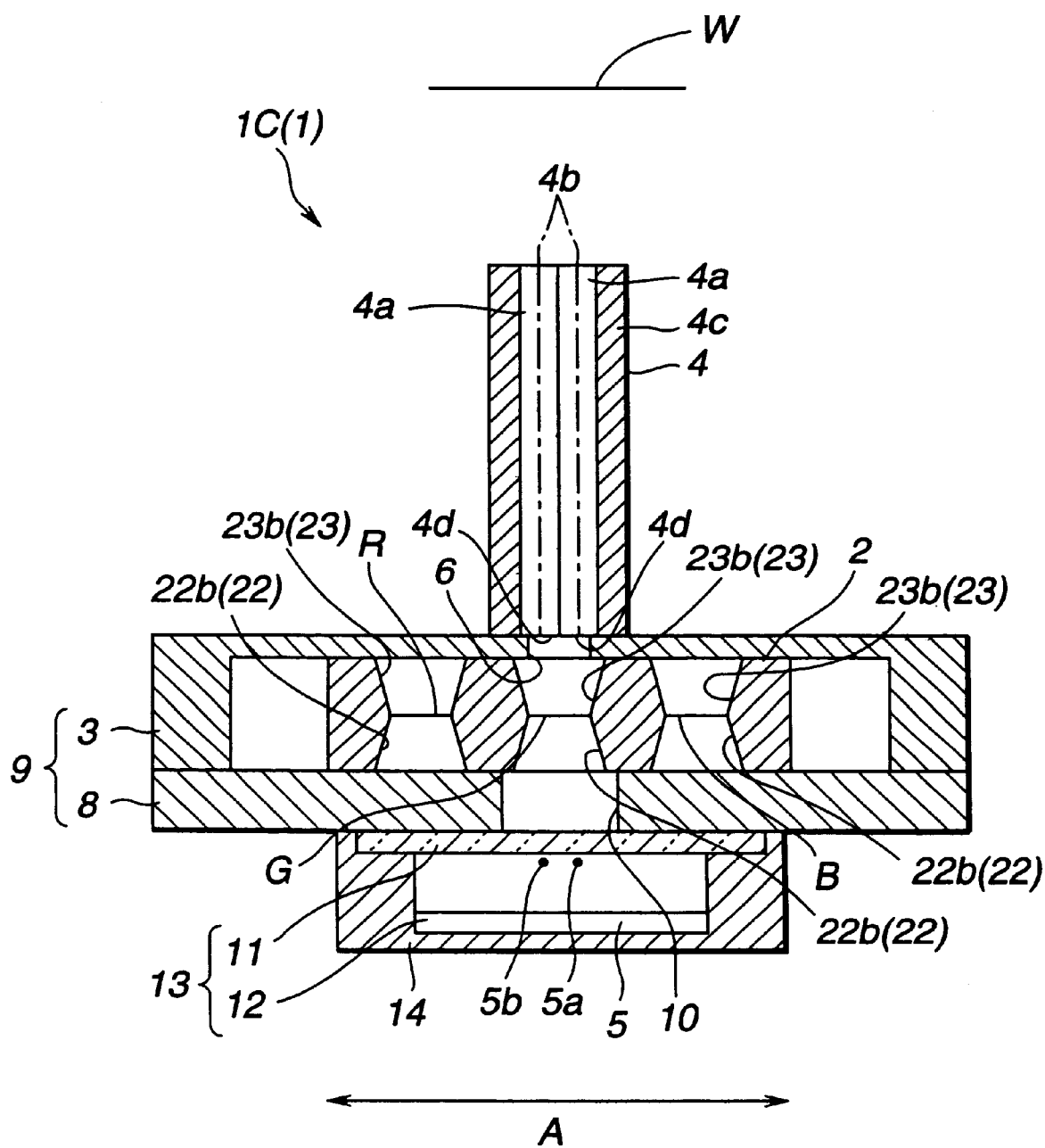
FIG. 12 is a sectional view showing a third embodiment of an optical printer head according to the present invention, which includes second inclined surfaces.
Figure 13:
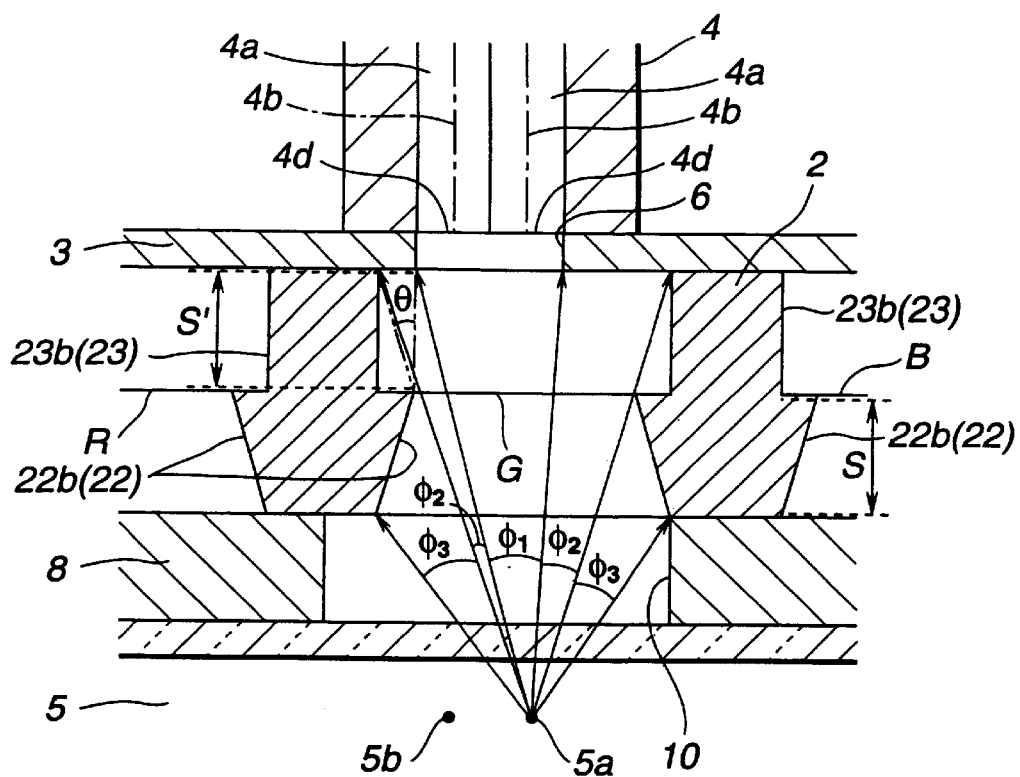
FIG. 13 is a fragmentary enlarged sectional view showing a third embodiment of an optical printer head according to the present invention, which includes second diameter-increased reflection surfaces.
Figure 14:
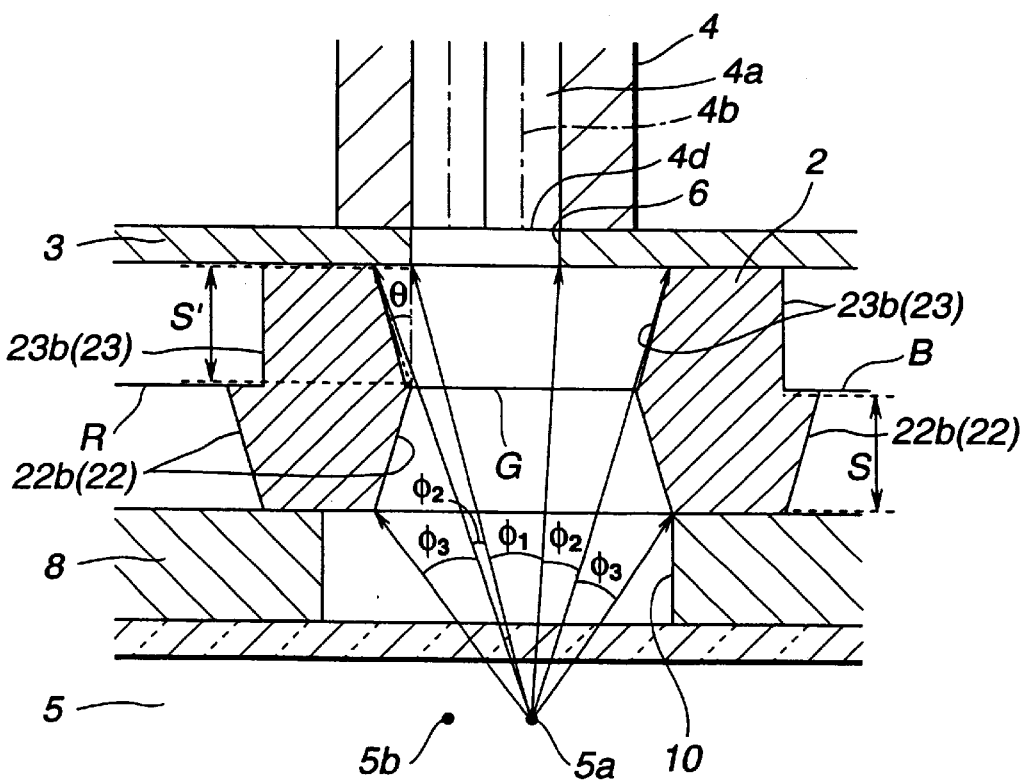
FIG. 14 is a fragmentary enlarged sectional view showing a third embodiment of an optical printer head according to the present invention, which includes second inclined surfaces.
Figure 15:
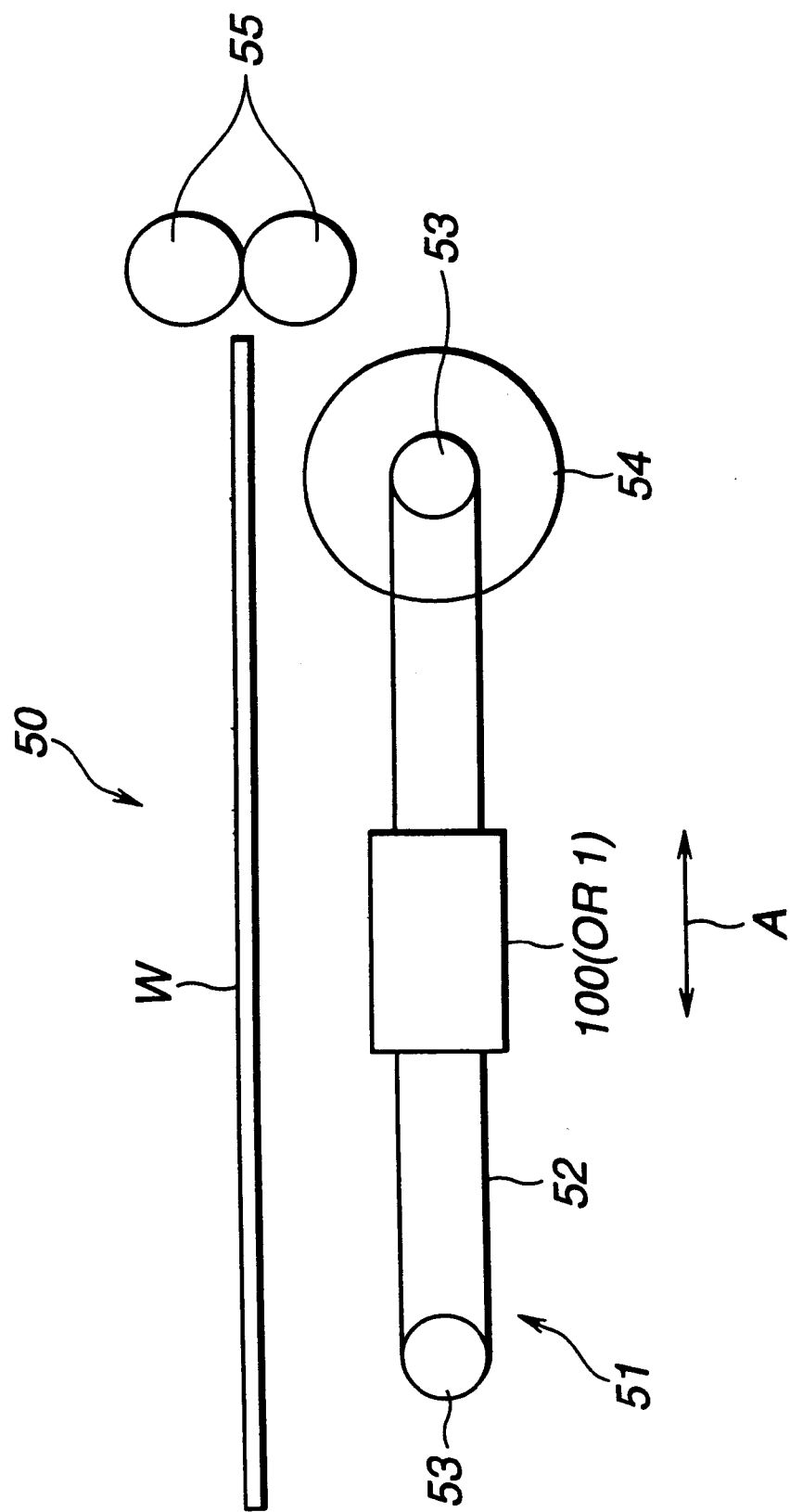
FIG. 15 is a schematic view showing an optical printer.
Figure 16:
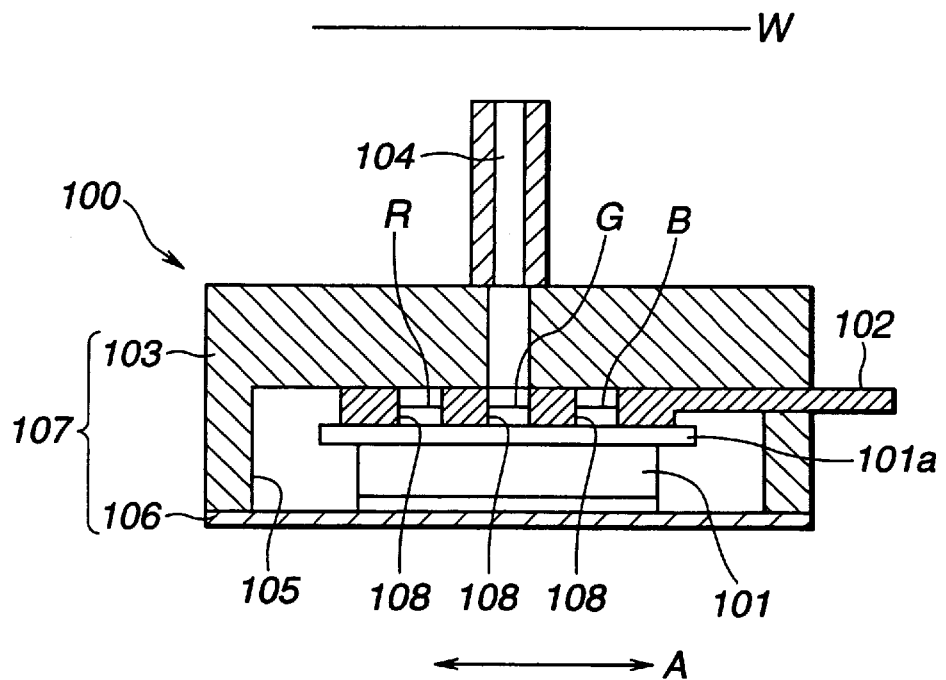
FIG. 16 is a sectional side elevation view showing a conventional optical printer head.
Figure 17:
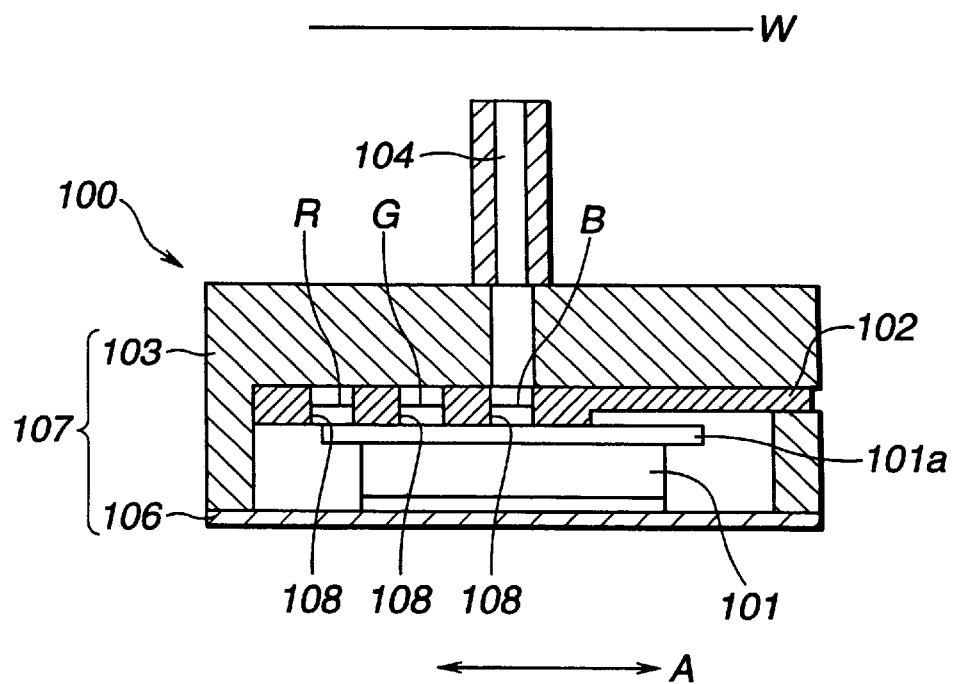
FIG. 17 is a sectional side elevation view showing operation of a conventional optical printer head.

The second reflection surfaces 23 each may constitute a second diameter-increased reflection surface 23a as shown in FIGS. 11 and 13 or a second inclined surface 23b as shown in FIGS. 12 and 14.

The second diameter-increased reflection surface 23a, as shown in FIGS. 11 and 13, is defined on the portion of the filter holding hole 7 on the side of the SLA 4 based on the color filters R, G and B. The second diameter-increased reflection surface 23a, when a length thereof in a direction of a light path is indicated at D, is formed into a diameter larger by D. tan θ or more than a diameter of the light passage hole 7 shown in FIG. 6.

The second inclined surfaces 23b, as shown in FIGS. 12 and 14, each are defined on the portion of the peripheral surface of the filter holding hole 7 on the side of the SLA 4 based on the color filters and inclined at a predetermined angle so as to spread toward the SLA 4 from a position at which the color filters R, G and B are mounted. More particularly, the second inclined surface 23b has an inclination angle set to be equal to or larger than a maximum allowable incident angle θ of the SLA 4. Thus, supposing that the second inclined surface 23b has any optional diameter width E, the inclined surface is formed so as to be larger by E. sin θ than the portion of the peripheral surface of the filter holding hole 7 on the side of the SLA 4 based on the color filters R, G and B shown in FIG. 6.

Thus, the optical printer head 1C of the illustrated embodiment prevents generation of a ghost by light reflected on the portion of the peripheral surface of the filter holding hole 7 on the side of the SLA 4 based on the color filters R, G and B when a center of the color filter R, G or B selected is positioned while being deviated from an optical axis of the SLA 4 as shown in FIGS. 13 and 14.

In the embodiment shown in FIGS. 13 and 14, light is likewise emitted from luminous dots 5a and 5b of a fluorescent luminous tube 5. Of light emitted in a range of a radiant angle φ1, light incident on an incident surface 4d of the SLA 4 within the maximum allowable incident angle θ passes through the SLA 4 and then forms an image on a record medium W. On the contrary, light reaching the incident surface 4d out of the maximum allowable incident angle θ fails to be incident on the SLA 4.

Light emitted in a range of a radiant angle φ2 from the luminous dots 5a and 5b of the fluorescent luminous tube 5 reaches an upper wall of a housing 3. However, it fails to be incident on the incident surface 4d. Light emitted in a range of a radiant angle φ3 is reflected on the first inclined surface 22b and therefore is kept from being incident on the incident surface 4d of the SLA 4 as in the second embodiment described above.

In the optical printer head of the illustrated embodiment, the first inclined surface 22b may be formed so as to be rough or in a step-like manner. Such formation of the first inclined surface 22b permits light emitted in a range of the radiant angle φ3 to be incident on the rough or step-like incident surface 22b, to thereby be scattered. This prevents repeated reflection of the light on the peripheral surface of the filter holding hole 7, to thereby prevent a reduction in contrast by background light.

In each of the embodiments described above, the fluorescent luminous tube 5 is used as the light source. Alternatively, a field emission display device, an organic electroluminescent device or the like may be used as the light source. Also, the optical printer head of each of the above-described embodiments is constructed so as to be moved in the sub-scanning direction A. Alternatively, the embodiments each may be constructed in such a manner that the optical printer head is stationary and the record medium W is moved in the sub-scanning direction A. Thus, it is merely required that the record medium and optical printer head 1 are arranged so as to be movable relatively to each other in the sub-scanning direction A.

As can be seen from the foregoing, the optical printer head of the present invention substantially prevents or minimizes generation of a ghost due to incidence of reflected light on the image formation means by reflecting light emitted from the light source out of the maximum allowable incident angle, even when the filter holding hole for holding the filter therein is reduced in size for the purpose of small-sizing the head.

Also, in the present invention, the peripheral surface of the filter holding hole is rendered rough, to thereby provide a scattering surface, resulting in preventing repeated reflection of light emitted from the light source on the peripheral surface of the filter holding hole. This prevents a reduction in contrast due to background light provided by the reflected light.

Further, the present invention minimizes generation of a ghost by incidence of reflected light on the image formation means by reflecting light emitted from the light source out of the maximum allowable incident angle, even when positional deviation occurs in the filter holding hole due to a mechanism error during changing-over among the filters by movement of the filter holder.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An optical printer head comprising:
   a base having a pair of light passage holes formed through walls thereof opposite to each other;
   a filter holder formed with a plurality of filter holding holes spaced from each other at predetermined intervals;
   filters formed so as to be different in permeation wavelength and held in said filter holding holes, respectively;
   said filter holder being received in said base in a manner to be movable therein and moved so as to position any desired one of said filters on a light path defined between said light passage holes;
   a light source arranged on an outside of one of said walls of said base; and
   image formation device arranged on an outside of the other of said walls of said base opposite to said light source to form light incident on an incident surface thereof within a predetermined maximum allowable incident angle into an image on a record medium;
   said filter holding holes each including a peripheral surface having a portion which permits light emitted from said light source to be reflected thereon at an angle out of said maximum allowable incident angle;
   whereby image formation on the record medium is carried out in synchronism with movement of the optical printer head relative to the record medium.

2. An optical printer head as defined in claim 1, wherein said peripheral surface of said filter holding hole is so formed that a portion thereof positioned on a side of said light source is formed into a reflective surface increased in diameter as compared with a portion thereof positioned on a side of said image formation device.

3. An optical printer head as defined in claim 2, wherein said reflective surface is inclined at an angle equal to or larger than said maximum allowable incident angle.

4. An optical printer head as defined in claim 1, wherein said portion of said peripheral surface of said filter holding hole on the side of said light source is provided in the form of a scattering surface for subjecting light incident thereon to irregular reflection.

5. An optical printer head as defined in claim 1, wherein said reflective surface is provided in the form of a scattering surface for subjecting light incident thereon to irregular reflection.

6. An optical printer head as defined in claim 1, wherein said scattering surface has reflectance of 60% or less.

* * * * *